United States Patent
Nitsuma

(10) Patent No.: US 8,678,494 B2
(45) Date of Patent: Mar. 25, 2014

(54) VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 599 days.

(21) Appl. No.: 12/743,401

(22) PCT Filed: Nov. 20, 2008

(86) PCT No.: PCT/JP2008/071118
§ 371 (c)(1),
(2), (4) Date: May 18, 2010

(87) PCT Pub. No.: WO2009/066730
PCT Pub. Date: May 28, 2009

(65) Prior Publication Data
US 2010/0270835 A1   Oct. 28, 2010

(30) Foreign Application Priority Data
Nov. 21, 2007   (JP) ................... 2007-301890

(51) Int. Cl.
*B60N 2/42*   (2006.01)
(52) U.S. Cl.
USPC ................. 297/216.12; 297/216.13
(58) Field of Classification Search
USPC ....................... 297/216.13, 216.12
See application file for complete search history.

(56) References Cited

U.S. PATENT DOCUMENTS

| 6,375,262 | B1 * | 4/2002 | Watanabe | 297/284.4 |
| 6,702,377 | B2 * | 3/2004 | Nakano | 297/216.12 |
| 6,871,913 | B2 * | 3/2005 | Malsch et al. | 297/410 |
| 7,044,544 | B2 * | 5/2006 | Humer et al. | 297/216.12 |
| 7,077,472 | B2 * | 7/2006 | Steffens, Jr. | 297/216.13 |
| 7,104,602 | B2 * | 9/2006 | Humer et al. | 297/216.12 |
| 7,163,261 | B2 * | 1/2007 | Kawashima | 297/216.14 |
| 7,401,852 | B2 * | 7/2008 | Humer et al. | 297/216.13 |

FOREIGN PATENT DOCUMENTS

| JP | 2001-001820 A | 1/2001 |
| JP | 2006-182094 A | 7/2006 |
| JP | 2007-062523 A | 3/2007 |

* cited by examiner

*Primary Examiner* — David R Dunn
*Assistant Examiner* — Tania Abraham
(74) *Attorney, Agent, or Firm* — Drinker Biddle & Reath LLP

(57) ABSTRACT

There is provided a vehicle seat that includes a seat back frame having a pair of side frames disposed in a spaced manner in the right and left direction, a plate-like support body disposed between the pair of side frames to receive a load placed by the rearward movement of a passenger, a transmission section connecting the plate-like support body to a headrest via a link mechanism, and a holding member disposed in the link mechanism. The holding member is disposed at a position separating from a rotating shaft of a lower link by a predetermined distance to connect the lower link to the side frame, and keeps the distance between the lower link and the side frame at a predetermined value.

14 Claims, 6 Drawing Sheets

VEHICLE SEAT

CROSS REFERENCE TO RELATED APPLICATIONS

This application is the U.S. national phase of the International Patent Application No. PCT/JP2008/071118 filed Nov. 20, 2008, which claims the benefit of Japanese Patent Application No. 2007-301890 filed Nov. 21, 2007, the entire content of which is incorporated herein by reference.

BACKGROUND

The present invention relates to a vehicle seat and, more particularly, to a vehicle seat having a mechanism for moving a headrest in a rear-end collision.

When a collision of a vehicle, such as an automobile, occurs from the rear (a so-called rear-end collision), the head of a seated passenger is moved suddenly to the rear by inertia, and the neck may be shocked. Therefore, there has conventionally been known a vehicle seat provided with a configuration for buffering a shock by moving the headrest to the front and supporting the passenger's head at the time of the occurrence of the rear-end collision to protect the head, the neck, and the like of the passenger from the shock in a rear-end collision (see, e.g., Japanese Unexamined Patent Application Publication No. 2006-182094 ("the '094 Application")).

The vehicle seat described in the '094 Application has a configuration in which a plate body is mounted to a seat back frame of a seat back to be movable back and forth, a headrest is mounted in the upper part of the seat back frame to be movable by an upper link, a lower link connected to the plate body is rotatably provided in the lower part of the seat back frame, and the lower link and the upper link are connected to each other by a transmission member, and is configured so that a load sensed by the plate body at the time of rear-end collision is transmitted from the lower link to the upper link to move the headrest to the front.

For this vehicle seat, the load at the time when the passenger is moved to the rear by rear-end collision is received by a portion near the waist having a rearward displacement larger than that of the back, whereby the rear-end collision can be sensed with certainty. Also, by the configuration in which the load received by the plate body is transmitted to the upper link via the lower link and the transmission member, the load can be transmitted to the upper link with high transmission efficiency, so that the operation for moving the headrest to the front becomes reliable.

The lower link of the vehicle seat is configured as shown in FIG. 6. As shown in FIG. 6, a lower link 91 is rotatably fixed on the inside of a side frame 90 of the seat back frame by a shaft 92. Also, the lower end part of a transmission member 95 is rotatably connected to a portion below the shaft 92 of the lower link 91 via a shaft 93. Further, in a lower part of the lower link 91, a wire spring 98 is locked to a locking hole 94, so that the lower link 91 is connected to the plate body via the wire spring 98.

When the passenger is moved to the rear by a rear-end collision and a rearward load is applied to the plate body, the plate body is moved to the rear, whereby the wire spring 98 is moved to the rear. Then, the lower part of the lower link 91 is pulled to the rear by the wire spring 98, and is rotated to the rear around the shaft 92. When the lower part of the lower link 91 is rotated to the rear, the transmission member 95 connected to the lower link 91 moves to the rear. This rearward movement of the transmission member 95 is transmitted to the upper link, whereby the upper link is rotated to the front. Thereby, the headrest is moved to the front to support the passenger's head. The lower link 91 and the transmission member 95 are configured so that the rotating direction and the movement direction thereof are substantially parallel with the side frame 90.

In the technique described in the '094 Application, since the lower link 91 is attached to the side frame 90 by only one shaft 92, when a shock (load) applied to the plate body by a rear-end collision is transmitted to the lower link 91 via the wire spring 98, and the load is applied suddenly to the inside direction of the side frame 90, the lower link 91 is sometimes rotated to the slantwise direction with respect to the direction parallel with the side frame 90.

If the lower link 91 is rotated in a state of being slantwise tilted with respect to the direction parallel with the side frame 90 while being attached to the side frame 90 by the shaft 92, the transmission member 95 connected to the lower link 91 moves in a state of being tilted to the slantwise direction, that is, to the inside direction or the outside direction of the seat back frame, and further the upper link connected to the transmission member 95 rotates in a state of being slantwise tilted.

If the link mechanism operates in a state of being slantwise tilted with respect to the direction parallel with the side frame 90, that is, the inherent rotating direction, a loss occurs in the load for moving the headrest to the front, which load is transmitted from the plate body to the headrest via the link mechanism. Thus, by the operation of link mechanism in a slantwise tilted state, the load for moving the headrest to the front sometimes cannot be maximally used.

SUMMARY

An object of various embodiments of the present invention is to provide a vehicle seat configured so that, at the time of the occurrence of a rear-end collision of a vehicle, the headrest is moved to the front to support the passenger's head and to buffer a shock applied to the head, in which a load can be transmitted to the headrest with high transmission efficiency by preventing a loss of the load for moving the headrest to the front.

To achieve the above object, the vehicle seat is provided having a mechanism for moving a headrest in a rear-end collision that comprises: a seat back frame having a pair of side frames disposed in a spaced manner in a right and left direction; a pressure receiving part disposed between the pair of side frames to receive a load placed by a rearward movement of a passenger; a transmission section connecting the pressure receiving part to the headrest via a link mechanism; and a holding member disposed in the link mechanism, wherein the link mechanism has a lower link rotatably mounted in a lower part of at least one side frame of the pair of side frames and connected to the pressure receiving part; an upper link connected to the headrest; and a connecting link connecting the lower link and the upper link to each other, and the holding member is disposed at a position separating from a rotating shaft of the lower link by a predetermined distance to connect the lower link to the side frame, and to keep the distance between the lower link and the side frame at a predetermined value.

Thus, according to this vehicle seat, the configuration is such that the lower link is connected to the side frame by the holding member disposed at the position separating from the rotating shaft of the lower link by a predetermined distance, and the distance between the lower link and the side frame is kept at a predetermined value. By this configuration, when the lower link is rotated by a load received by the pressure receiving part, and a transmission section is operated, the lower link is rotated while keeping a direction parallel with the side frame, so that the transmission section can be prevented from tilting to the seat inside or outside and falling down slantwise. As a result, a loss of the load for moving the headrest to the front can be suppressed, and thereby the load can be transmitted to the headrest with high efficiency.

At this time, it is preferable that the lower link have a guide hole of an arcuate shape with the rotating shaft being the center at a position below the rotating shaft, and rotate by being regulated by the holding member inserted through the guide hole.

If the holding member is inserted through the arcuate guide hole to regulate the rotating of the lower link in this manner, the lower link can rotate to the direction parallel with the side frame without a hindrance to the rotating of the lower link placed by the holding member.

Also, the configuration can be made such that the lower link has a guide hole of an arcuate shape with the rotating shaft being the center at a position above the rotating shaft, and rotates by being regulated by the holding member inserted through the guide hole.

Even if the guide hole is formed at the position above the rotating shaft of the lower link, and the holding member is provided in the upper part of the lower link in this manner, as in the case where the guide hole is formed at the position below the rotating shaft, the lower link can rotate to the direction parallel with the side frame without a hindrance to the rotating of the lower link placed by the holding member.

According to the vehicle seat in accordance with various embodiments of the present invention, in a vehicle seat configured so that the headrest is moved to the front in a rear-end collision, a load can be transmitted to the headrest with high transmission efficiency by preventing a loss of the load for moving the headrest to the front.

BRIEF DESCRIPTION OF DRAWINGS

Various embodiments of the invention are described below with reference to the following drawing figures and associated descriptive text.

DETAILED DESCRIPTION OF THE EMBODIMENTS

One embodiment of the present invention will now be described with reference to the accompanying drawings. The members, arrangements, and the like described below do not restrict the present invention, and, needless to say, various changes and modifications can be made within the scope of teachings of the present invention.

Figure 1:
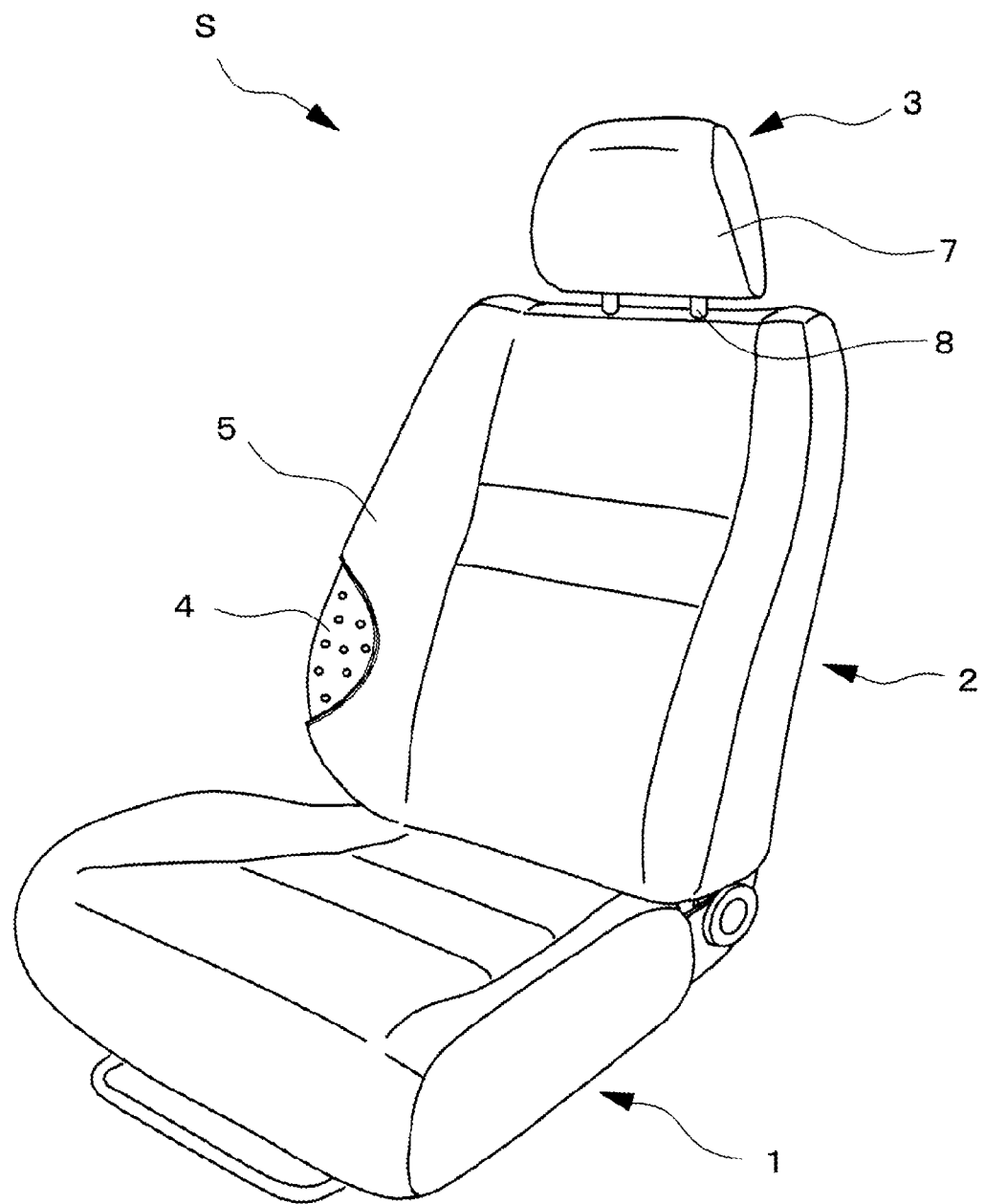
FIG. 1 is a perspective view of a vehicle seat in accordance with one embodiment of the present invention.

FIGS. 1 to 5 relate to one embodiment of the present invention. As shown in FIG. 1, a vehicle seat S of this embodiment includes a seat cushion 1, a seat back 2, and a headrest 3 mounted above the seat back 2. The seat cushion 1 and the seat back 2 of this embodiment are configured so that a cushion material 4 is attached to a seat cushion frame 10 and a seat back frame 20 (refer to FIG. 2), respectively, and the outer periphery of the cushion material 4 is covered with a cover material 5. The configuration of the headrest 3 is optional, and the headrest 3 is configured by including at least a head supporting part 7 for supporting the passenger's head and pillars 8 for mounting the head supporting part 7 to the seat back 2.

Figure 2:
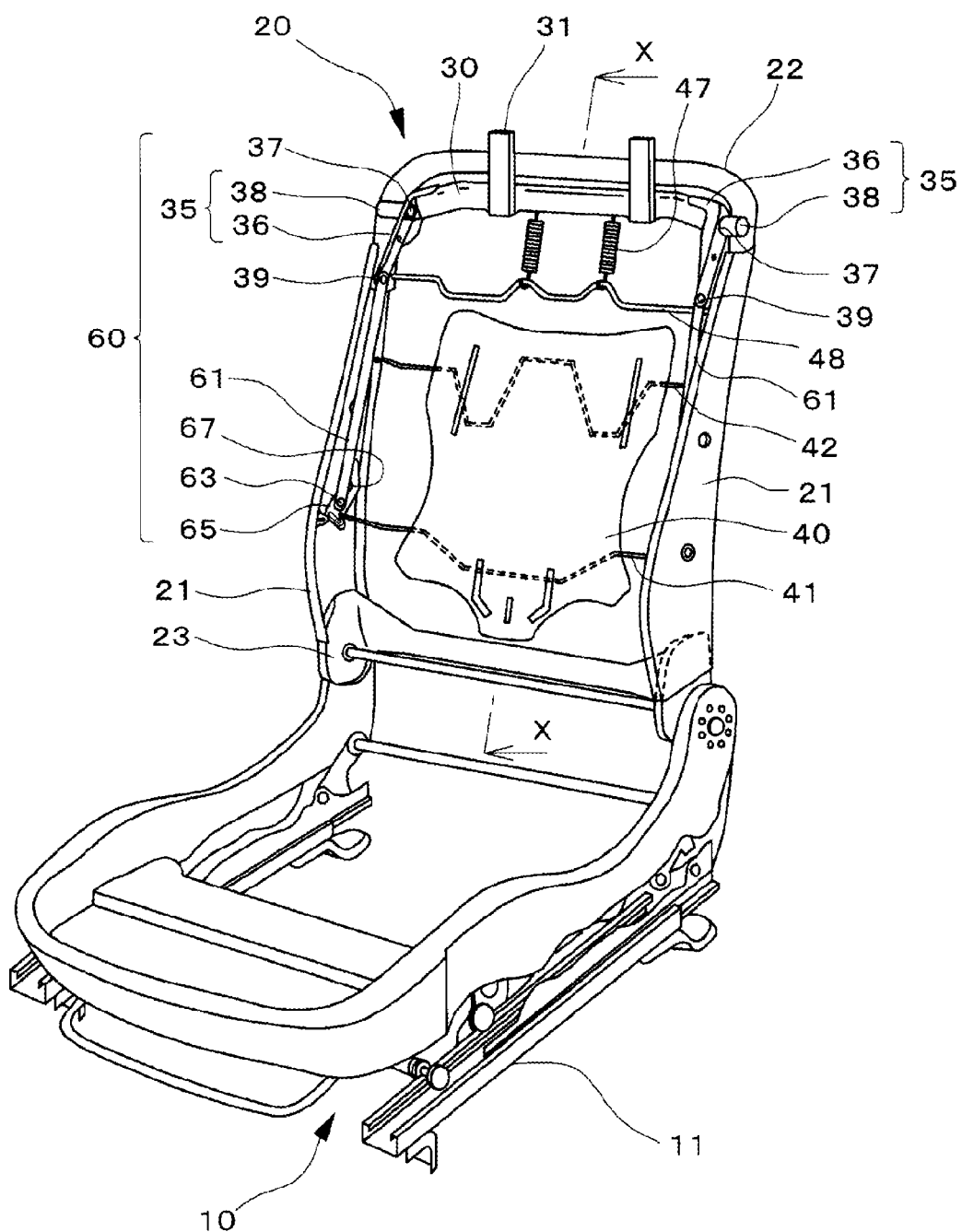
FIG. 2 is a schematic perspective view of a seat frame for a vehicle seat in accordance with one embodiment of the present invention.

As shown in FIG. 2, the frame of the vehicle seat S of this embodiment and the mechanism provided in the frame include, as principal elements, frames such as the seat cushion frame 10, the seat back frame 20, and a headrest mounting rod 30, a plate-like support body 40 serving as a pressure receiving part that is disposed in a substantially central portion of the seat back frame 20, a transmission section 60 for connecting the plate-like support body 40 to the headrest 3, and the like.

As shown in FIG. 2, the frame of the vehicle seat S of this embodiment is configured by the seat cushion frame 10 constituting the seat cushion 1, the seat back frame 20 constituting the seat back 2, a base frame 11 connecting the vehicle seat S to a vehicle body floor (not shown), and the like. The seat back frame 20 has a pair of side frames 21 disposed in a spaced manner in the right and left direction and each having a predetermined length in the up and down direction, an upper frame 22 connecting the upper end parts of the side frames 21 to each other, and a lower frame 23 connecting the lower end parts of the side frames 21 to each other.

Near the upper frame 22 on the inside of the seat back frame 20, the headrest mounting rod 30 extending in the right and left direction to hold the headrest 3 is disposed. The pillars 8 for the headrest 3 are inserted through and installed in two pillar supporting members 31 provided on the headrest mounting rod 30 so that the headrest height can be adjusted. The configurations of the pillar 8 and the pillar supporting member 31 are publicly known: an engagement member provided on the pillar supporting member 31 is engaged with a not-illustrated engagement concave part formed in the pillar 8, thereby holding the headrest 3.

To both ends of the headrest mounting rod 30, one end of a link bracket 36 comprising a plate-like member having a substantially L-shaped cross section is fixed by welding or the like. The link bracket 36 is rotatably connected to one end of each of a pair of rotation supporting members 38 via a shaft 37 on the seat back frame 20 side. The rotation supporting member 38 of this embodiment is welded to a portion near the connecting part of the upper frame 22 with the side frame 21.

The end part of the link bracket 36 is connected to a connecting link 61, described below, via a shaft 39. The link bracket 36 connected to the connecting link 61 and the rotation supporting member 38 connected to the link bracket 36 constitute an upper link 35 in this embodiment.

Thus, the headrest mounting rod 30 is rotatably mounted to the seat back frame 20 via the link brackets 36 and the rotation supporting members 38 by the shafts 37. That is, in the state in which the headrest 3 is attached to the headrest mounting rod 30, the headrest 3 rotates with respect to the seat back frame 20 with the shafts 37.

In the substantially central portion of the seat back frame 20, the plate-like support body 40 serving as the pressure receiving part is disposed. This plate-like support body 40 is a plate-like member for supporting the passenger's back, and has a function of stabilizing the sitting posture by supporting the passenger's back by way of the surface thereof when the passenger normally sits on the seat, and operating the transmission section 60 serving as a link mechanism, described below, by being pressed and moved rearward by the rearward movement of the passenger when the vehicle is impacted from the rear.

The plate-like support body 40 is mounted to the right and left side frames 21 via two wire springs 41 and 42 disposed in parallel with each other in the up and down direction to be movable back and forth. Both ends of the wire spring 42 disposed above are mounted in wire locking holes (not shown) of the side frames 21, and both ends of the wire spring 41 disposed below are locked to wire locking holes 68 (connecting member attachment portion) in lower links 65 of the transmission sections 60, described below, so that the wire spring 41 is mounted to the side frames 21 via the lower links 65. This wire spring 41 disposed below is a connecting member that connects the plate-like support body 40 to the transmission sections 60 and further connects the plate-like support body 40 to the side frames 21 via the transmission sections 60.

The plate-like support body 40 of this embodiment is formed of a synthetic resin such as polypropylene to have a strength to support the passenger, and supports the passenger while being elastically deformed to some extent when receiving a rearward load from the passenger. Also, the wire spring 41, 42 has predetermined elasticity, and extends to some extent to move the plate-like support body 40 to the rear when a load is applied to the plate-like support body 40. As the wire spring 41, 42, a zigzag spring, a formed wire spring, or the like can be used.

Above the plate-like support body 40, a spring support wire 48 extending in the right and left direction is disposed so that both ends thereof are fixed to the side frames 21, and two return springs 47 are disposed in a spaced manner in parallel with each other between the headrest mounting rod 30 and the spring support wire 48. Except at the time of a rear-end collision of vehicle, the return springs 47 urge the headrest mounting rod 30 to the rear to erect the headrest 3.

Figure 3:
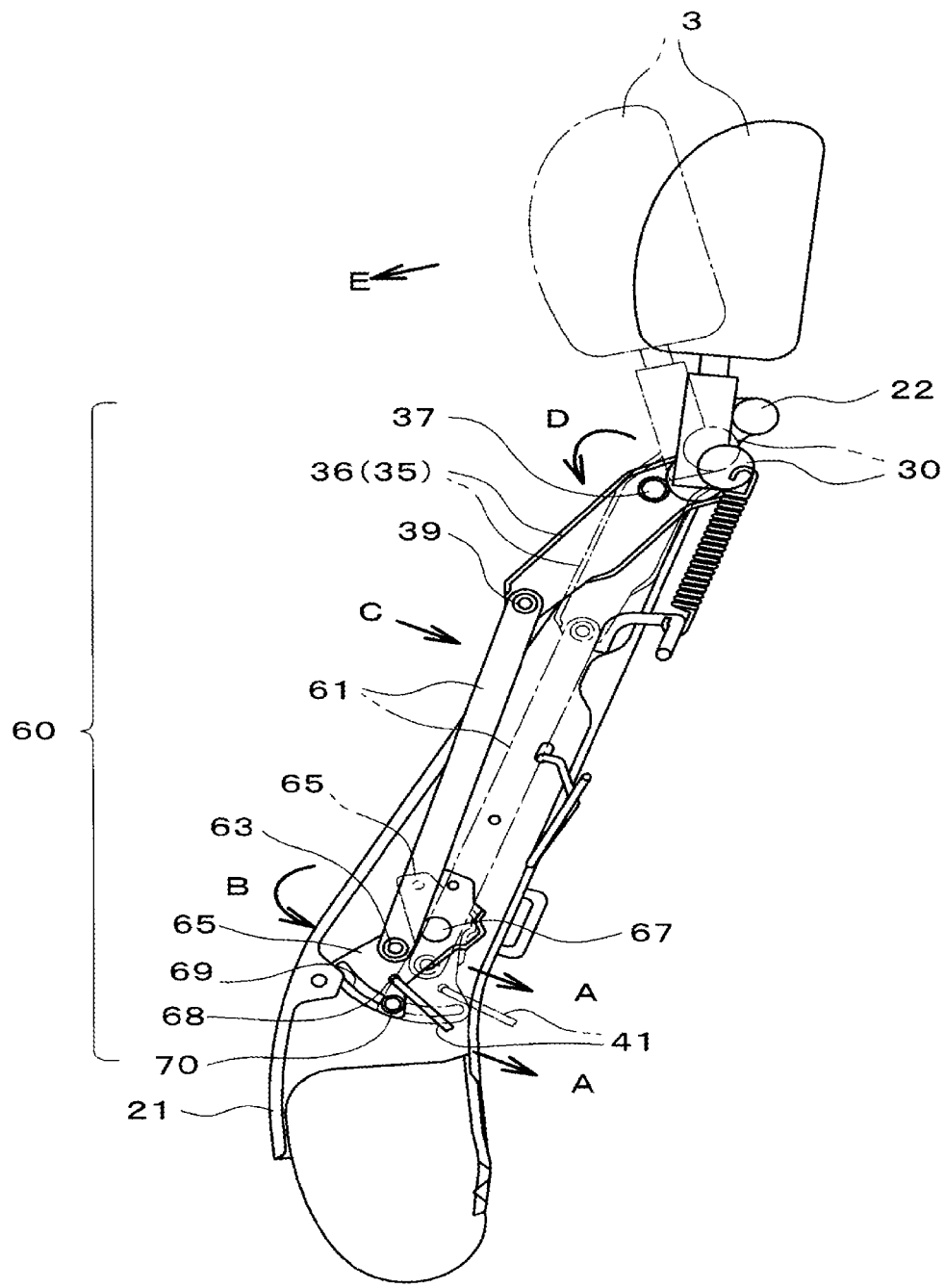
FIG. 3 is an operation explanatory sectional view taken along the line X-X of FIG. 2.

Furthermore, as shown in FIGS. 2 and 3, the vehicle seat S of this embodiment is provided with the transmission section 60, which is connected to the plate-like support body 40 via the wire spring 41, on the inside of the side frame 21. FIG. 3 is a sectional view taken along the line X-X of FIG. 2, showing the seat back frame 20 and members disposed on the inside thereof shown in FIG. 2. When a rearward load is applied to the plate-like support body 40, the load is transmitted to the transmission section 60 via the wire spring 41, and is further transmitted to the headrest 3 side via the transmission section 60. The vehicle seat S of this embodiment has an active headrest mechanism such that when the vehicle receives a shock from the rear and the passenger moves to the rear, the headrest 3 moves to the front with respect to the seat back 2 to positively support the passenger's head. The frontward movement of the headrest 3 due to the active headrest mechanism is realized by the transmission of the load received by the plate-like support body 40 to the headrest 3 side via the transmission section 60.

The transmission section 60 of this embodiment forms the link mechanism formed by principal elements of the upper link 35, the lower link 65, and the connecting link 61 connecting the upper link 35 to the lower link 65. The upper link 35 is formed by the link bracket 36 and the rotation supporting member 38 as described above. As shown in FIGS. 2 and 3, the link bracket 36 extends downward from the connecting part with the headrest mounting rod 30, and to the end part on the opposite side to the headrest mounting rod 30, the upper end part of the connecting link 61 is rotatably fixed via the shaft 39.

The connecting link 61, which is a plate-like member extending in the up and down direction, is provided to hang down from the lower end part of the link bracket 36. The lower end part of the connecting link 61 is rotatably connected to the corner part of the front on the lower side of the lower link 65 by a shaft 63 (coupling portion). Thus, the connecting link 61 connects the lower link 65 and the upper link 35 to each other.

Figure 4:
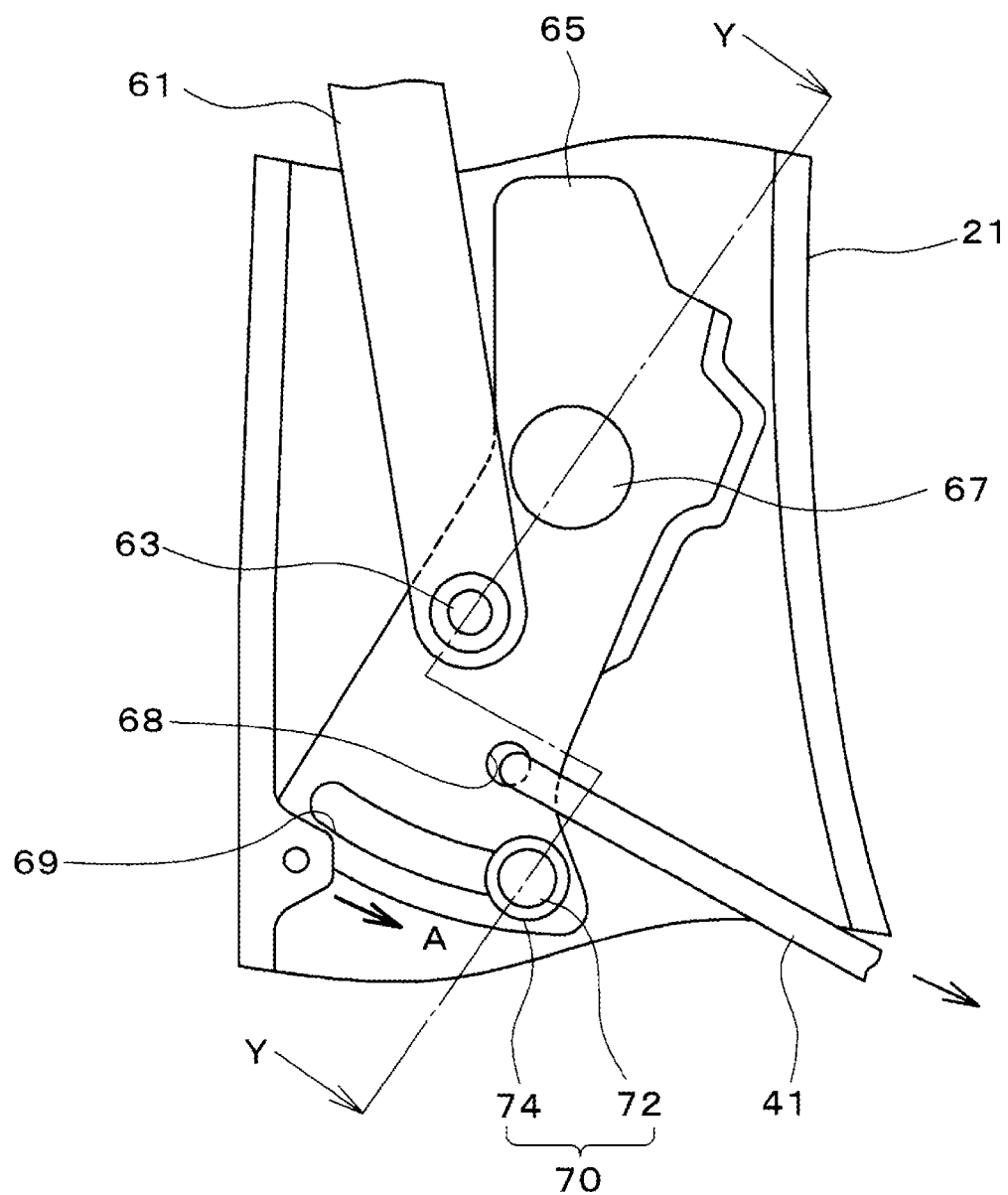
FIG. 4 is an enlarged explanatory side view of a lower link for a vehicle seat in accordance with one embodiment of the present invention.

As shown in FIG. 4, the lower link 65 of this embodiment, which is a substantially chevron-shaped plate-like member, is rotatably fixed to the inside surface of the side frame 21 by a shaft 67. Also, the wire locking hole 68 is formed below the shaft 63 of the lower link 65. One end of the wire spring 41 is inserted through the wire locking hole 68, and the end part of the wire spring 41 is bent, whereby the wire spring 41 is locked to the wire locking hole 68.

Figure 5:
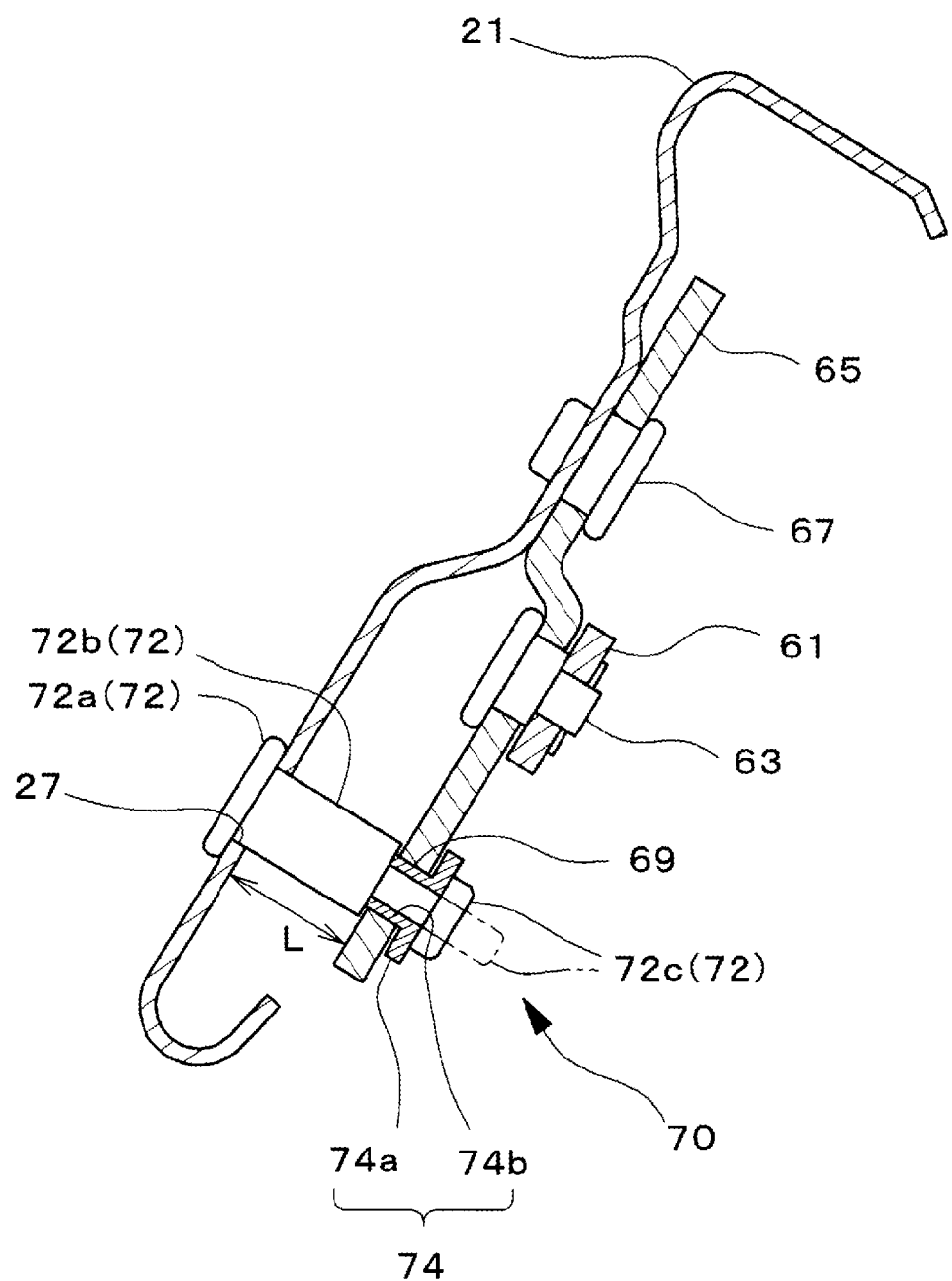
FIG. 5 is a sectional view taken along the line Y-Y of FIG. 4.
Figure 6:
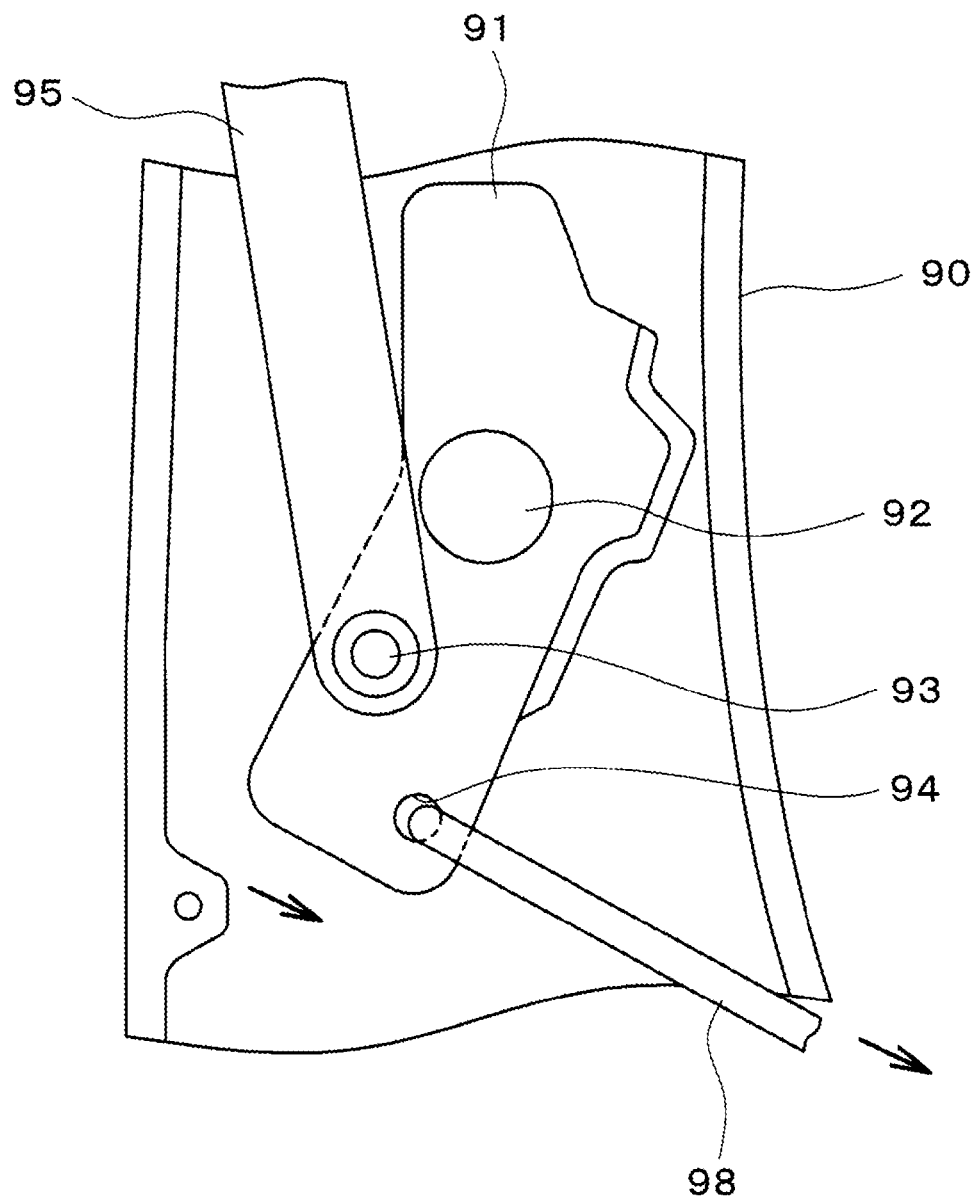
FIG. 6 is an enlarged explanatory view of a lower link for a conventional vehicle seat.

Furthermore, below the wire locking hole 68, an elongated hole 69 extending to the right and left direction as a guide hole is formed. Specifically, this elongated hole 69 is formed into an arcuate shape along the rotating direction at the time when the lower link 65 rotates around the shaft 67. In this embodiment, as shown in FIGS. 4 and 5, between the elongated hole 69 in the lower link 65 and a pin mounting hole 27 formed in the side frame 21, a holding member 70 is inserted and locked, and the side frame 21 and the lower link 65 are connected to each other. FIG. 5 is a sectional view taken along the line Y-Y of FIG. 4.

The holding member 70 of this embodiment is a member that is formed by a pin 72 and a spacer 74, connects the side frame 21 and the lower link 65 to each other, and keeps the distance between the side frame 21 and the lower link 65 at a predetermined value. The pin 72 is formed by a pin head 72*a*, a shank part 72*b*, and a pin point 72*c*. In this embodiment, as the pin 72, a stepped flat head rivet having two different diameters of the shank part 72*b* is used.

The spacer 74 of this embodiment is a member having a T shape in side view, including a collar part 74*a* and a hollow shell part 74*b*, and the shell part 74*b* is formed into a shape slightly longer than the thickness of the lower link 65, so that when the spacer 74 is interposed between the lower link 65 and the pin 72, a clearance is secured so that the pin 72 can move in the elongated hole 69 of the lower link 65. The spacer 74 is preferably formed of a material having a low friction coefficient, such as a fluorocarbon resin, so that the pin 72 can move smoothly in the elongated hole 69.

The pin 72 and the spacer 74 of the holding member 70 are mounted as described below to connect the lower link 65 to the side frame 21. First, the pin 72 is inserted through the pin mounting hole 27 from the outside (the left-hand side in FIG. 5) of the side frame 21, and the pin head 72*a* is fixed to the side frame 21 by welding or the like. At this time, the pin point 72*c* (the chain line in FIG. 5) is inserted through the elongated hole 69 in the lower link 65. Successively, the T-shaped spacer 74 is put onto the pin point 72*c* from the outside (the right-hand side in FIG. 5) of the lower link 65, and the shell part 74*b* of the spacer 74 is fitted between the shank part 72*b* of the pin 72 and the elongated hole 69. Thereafter, the pin point 72*c* is formed by caulking (the solid line in FIG. 5) to mount the pin 72. Thus, the lower link 65 is connected to the side frame 21 by the holding member 70.

Next, the operation of the transmission section 60 and the headrest 3 at the time of occurrence of rear-end collision of vehicle is explained.

As shown in FIG. 3, when the vehicle is impacted from the rear and a load not smaller than a predetermined magnitude is applied to the plate-like support body 40, the plate-like support body 40 and the wire spring 41 move rearward, that is, to the direction indicated by the arrow mark A in FIG. 3. When the wire spring 41 moves rearward, the lower part of the lower link 65 is pulled by the wire spring 41, and rotates to the direction indicated by the arrow mark B in FIG. 3 around the shaft 67.

When the lower link 65 rotates to the direction indicated by the arrow mark B, the shaft 63 connecting the lower link 65 and the connecting link 61 to each other moves rearward, and the connecting link 61 moves rearward, that is, to the direction indicated by the arrow mark C in FIG. 3. Then, the lower side of the link bracket 36 connected to the upper side of the connecting link 61 moves rearward, that is, to the direction indicated by the arrow mark C in FIG. 3, and the link bracket 36 rotates to the direction indicated by the arrow mark D in FIG. 3 around the shaft 37. Thereby, the headrest mounting rod 30 connected to the link bracket 36 is moved frontward, so that the headrest 3 moves to the direction indicated by the arrow mark E in FIG. 3, that is, frontward (the broken line in FIG. 3). Thus, when a rear-end collision of vehicle occurs, the transmission section 60 (the link mechanism) is operated by the load received by the plate-like support body 40, and the headrest 3 moves to the front to support the passenger's head.

At this time, the lower link 65 connected to the side frame 21 via the holding member 70 operates as described below. When a load is applied to the plate-like support body 40, and the lower link 65 is pulled by the wire spring 41, the elongated hole 69 of an arcuate shape with the shaft 67 being the center moves along the pin 72 with the pin 72 fixed to the side frame 21 being a guide. Therefore, the lower link 65 rotates rearward (to the direction indicated by the arrow mark A in FIG. 4) around the shaft 67.

In the state in which the holding member 70 is mounted, as shown in FIG. 5, since the shank part 72b of the pin 72 is interposed between the side frame 21 and the lower link 65, the side frame 21 and the lower link 65 are always separated by a predetermined distance L, and the predetermined distance is kept. Also, the pin head 72a of the pin 72 is fixed to the outside (the left-hand side in FIG. 5) of the side frame 21, and the collar part 74a of the spacer 74, having a diameter larger than the inside diameter of the elongated hole 69, and the caulked pin point 72c are mounted on the outside (the right-hand side in FIG. 5) of the lower link 65. Therefore, the outside of the side frame 21 and the outside of the lower link 65 are always held by the pin head 72a and the pin point 72c via the collar part 74a of the spacer 74.

The transmission section 60 of this embodiment is rotatably mounted to the upper frame 22 and the side frame 21 of the seat back frame 20 with the shaft 37 and the shaft 67. Since the transmission section 60 is of a long shape, and the shaft 37 and the shaft 67 have some distance therebetween, when a shock is produced by a rear-end collision or the like and the transmission section 60 moves, a load is sometimes applied to the direction tilting from the direction parallel with the side frame 21 (the front and rear direction of vehicle) to either the right or the left, that is, to the direction tilting to either the inside or the outside of the seat back frame 20. Also, when the shock (load) applied to the plate-like support body 40 is transmitted to the lower link 65 via the wire spring 41, the load is suddenly applied to the frame inside direction, and the load is sometimes applied to the direction tilting to the inside with respect to the transmission section 60.

The lower link 65 and the side frame 21 of this embodiment are connected to each other by two shafts of the shaft 67 and the holding member 70, and further, by the above-described configuration of the holding member 70, the side frame 21 and the lower part of the lower link 65 are connected so that the predetermined distance is kept therebetween. Therefore, even if a slantwise load is applied to the lower link 65, the rotating of the transmission section 60 is kept in the direction substantially parallel with the side frame 21.

Thus, since the rotating of the lower link 65 is regulated by the holding member 70 so that the lower link 65 rotates substantially in parallel with the side frame 21 within the range of the elongated hole 69, the transverse falling-down of the transmission section 60 can be prevented. When the link mechanism operates substantially in parallel with the seat back frame 20, the loss of load transmitted to the headrest 3 via the link mechanism can be suppressed, so that the load can be transmitted to the headrest 3 efficiently.

In the above-described embodiment, the holding member 70 and the elongated hole 69 through which the holding member 70 is inserted are disposed below the shaft 67 of the lower link 65 to be separated by the predetermined distance. However, the configuration may be such that an elongated hole is formed above the shaft 67 of the lower link 65 to be separated by the predetermined distance, and the holding member 70 is mounted by being inserted through the elongated hole. Even in the case where the holding member 70 is provided above the shaft 67 of the lower link 65 in this manner, the distance between the side frame 21 and the lower link 65 at the time of rotating of the lower link 65 can be kept, so that the slantwise tilting of the transmission section 60 can be prevented.

Also, the holding member 70 of the above-described embodiment is mounted by caulking the rivet. However, a bolt and nut or the like may be used in place of the rivet.

As described above, according to the vehicle seat in accordance with the various embodiments of the present invention, in the seat having a configuration such that, at the time of the occurrence of a rear-end collision, the headrest is moved to the front to support the passenger's head and to buffer a shock applied to the head, a load can be transmitted to the headrest with high transmission efficiency by preventing a loss of the load for moving the headrest to the front.

Table of Reference Characters
S vehicle seat
1 seat cushion
2 seat back
3 headrest
4 cushion material
5 cover material
7 head supporting part
8 pillar
10 seat cushion frame
11 base frame
20 seat back frame
21 side frame
22 upper frame
23 lower frame
27 pin mounting hole
30 headrest mounting rod
31 pillar supporting member
35 upper link
36 link bracket
37, 39 shaft
38 rotation supporting member
40 plate-like support body (pressure receiving part)
41 wire spring (connecting member)
42 wire spring
47 return spring
48 spring support wire
60 transmission section (link mechanism)

61 connecting link
63, 67 shaft (coupling portion)
65 lower link
68 wire locking hole (connecting member attachment portion)
69 elongated hole, guide hole
70 holding member
72 pin
72a pin head
72b shank part
72c pin point
74 spacer
74a collar part
74b shell part
90 side frame
91 lower link
92, 93 shaft
94 locking hole
95 transmission member
98 wire spring

The invention claimed is:

1. A vehicle seat having a mechanism for moving a headrest in a rear-end collision, comprising:
   a seat back frame having a pair of side frames disposed in a spaced manner in a right and left direction;
   a pressure receiving part disposed between the pair of side frames to receive a load placed by a rearward movement of a passenger;
   a transmission section connecting the pressure receiving part to the headrest via a link mechanism; and
   a holding member disposed in the link mechanism,
   wherein
   the link mechanism has:
      a lower link rotatably mounted in a lower part of at least one side frame of the pair of side frames and connected to the pressure receiving part;
      an upper link connected to the headrest; and
      a connecting link connecting the lower link and the upper link to each other,
   the holding member is disposed at a position separating from a rotating shaft of the lower link by a predetermined distance to connect the lower link to the side frame, and to keep the distance between the lower link and the side frame at a predetermined value,
   the lower link is provided with a guide hole through which the holding member is inserted,
   the vehicle seat further comprising:
      a connecting member that connects the pressure receiving part to the lower link; and
      a connecting member attachment portion of the lower link for attaching the connecting member to the lower link, the connecting member attachment portion being located between the rotating shaft and the guide hole.

2. The vehicle seat according to claim 1, wherein the guide hole is elongated in a front-to-rear direction along a lower end of the lower link.

3. The vehicle seat according to claim 1, wherein a spacer is provided between the guide hole and the holding member.

4. The vehicle seat according to claim 3, wherein the spacer is provided with a collar on a side towards a center of the seat.

5. The vehicle seat according to claim 4, wherein clearance is provided between a pin and the lower link.

6. The vehicle seat according to claim 4, wherein:
   the holding member comprises a shank part that is interposed between the side frame and the lower link; and
   an outside diameter of the collar of the spacer is larger than an inside diameter of the guide hole.

7. The vehicle seat according to claim 1, wherein:
   a) a coupling portion of the lower link at which the lower link is coupled with the connecting link; and
   b) the connecting member attachment portion,
   are located between the rotating shaft and the guide hole of the lower link.

8. The vehicle seat according to claim 1, wherein the guide hole extends anterior to, in a seat front-to-rear direction, a coupling portion of the lower link at which the lower link is coupled with the connecting link.

9. A vehicle seat having a mechanism for moving a headrest in a rear-end collision, comprising:
   a seat back frame having a pair of side frames disposed in a spaced manner in a right and left direction;
   a pressure receiving part disposed between the pair of side frames to receive a load placed by a rearward movement of a passenger;
   a link member rotatably mounted in a lower part of at least one side frame of the pair of side frames and connected to the pressure receiving part;
   a connecting member that connects the pressure receiving part to the link member; and
   a holding member mounted to the link member,
   wherein:
   the holding member is disposed at a position separating from a rotating shaft of the link member by a predetermined distance to connect the link member to the side frame, and to keep the distance between the link member and the side frame at a predetermined value,
   the link member is provided with a guide hole through which the holding member is inserted, and
   a connecting member attachment portion of the link member for attaching the connecting member to the link member is located between the rotating shaft and the guide hole of the link member.

10. The vehicle seat according to claim 9, wherein the guide hole is elongated in a front-to-rear direction along a lower end of the link member.

11. The vehicle seat according to claim 9, wherein a spacer is provided between the guide hole and the holding member.

12. The vehicle seat according to claim 11, wherein the spacer is provided with a collar on a side towards a center of the seat.

13. The vehicle seat according to claim 12, wherein clearance is provided between the a pin and the link member.

14. The vehicle seat according to claim 12, wherein:
   the holding member comprises a shank part that is interposed between the side frame and the link member; and
   an outside diameter of the collar of the spacer is larger than an inside diameter of the guide hole.

* * * * *